US006667565B2

(12) United States Patent
Strobl

(10) Patent No.: US 6,667,565 B2
(45) Date of Patent: Dec. 23, 2003

(54) PLANAR CARBON SEGMENT COMMUTATOR

(75) Inventor: Georg Strobl, Stuttgart (DE)

(73) Assignee: Johnson Electric S.A., La Chaux-de-Fonds (CH)

(*) Notice: Subject to any disclaimer, the term of this patent is extended or adjusted under 35 U.S.C. 154(b) by 27 days.

(21) Appl. No.: 10/083,389

(22) Filed: Feb. 27, 2002

(65) Prior Publication Data

US 2002/0117930 A1 Aug. 29, 2002

(30) Foreign Application Priority Data

Feb. 28, 2001 (GB) ............................................ 0104915

(51) Int. Cl.[7] ................................................ H02K 13/04
(52) U.S. Cl. .......................... 310/237; 310/234; 310/71
(58) Field of Search .......................... 310/71, 234, 237, 310/233, 235, 236, 42

(56) References Cited

U.S. PATENT DOCUMENTS

| | | | | |
|---|---|---|---|---|
| 4,584,498 A | | 4/1986 | Strobl | 310/236 |
| 5,157,299 A | | 10/1992 | Gerlach | 210/237 |
| 5,373,209 A | | 12/1994 | Strobl et al. | 310/234 |
| 5,386,167 A | * | 1/1995 | Strobi | 011995/310 |
| 5,679,996 A | | 10/1997 | Strobl | 310/237 |

FOREIGN PATENT DOCUMENTS

| | | |
|---|---|---|
| EP | 0 529 911 A2 | 3/1993 |
| EP | 0 667 657 A1 | 8/1995 |
| EP | 0 583 892 B1 | 5/1996 |
| EP | 0 667 657 B1 | 5/1998 |
| GB | 2 199 195 A | 6/1988 |
| JP | 11-55904 | 2/1999 |

* cited by examiner

*Primary Examiner*—Dang Le
(74) *Attorney, Agent, or Firm*—Birch, Stewart, Kolasch & Birch, LLP

(57) ABSTRACT

A planar carbon segment commutator includes a commutator base of insulating material. The base has a rotational axis and front and rear surfaces extending, at least in part, transversely to the rotational axis. A plurality of apertures extends through the base. The commutator also includes a plurality of commutator terminals, each terminal having a terminal portion and a contact portion. Each contact portion extends through one of the apertures and is bent to lie against or in close proximity to the front surface of the base. Each terminal portion has two cutting edges for cutting insulation on a connector portion of a winding and a slot which, in use, straddles and grips the connector portion. The commutator also includes a plurality of carbon segments formed on the front surface of the base and over the contact portions, respectively, of the terminals and a housing having a plurality of housing recesses for receiving the terminal portions.

20 Claims, 4 Drawing Sheets

PLANAR CARBON SEGMENT COMMUTATOR

FIELD OF THE INVENTION

This invention relates to a planar carbon segment commutator for use with brushes which bear axially against planar contact surfaces of the commutator, instead of bearing radially as in the case of a cylindrical commutator.

BACKGROUND OF THE INVENTION

It is known, for example from EP 0583892, to provide a planar commutator in which a plurality of commutator terminals are mounted on a commutator base and overmoulded with carbon segments. However, the terminals of these known planar commutators each have tangs to which the armature winding of an electric motor has to be connected.

A number of known methods for effecting such connections are in popular use. Where the winding is formed of low temperature wire, it is usual to employ a soft solder and flux method. Alternatively a cold crimp onto wire that has been stripped of insulation is used in order effect a connection. When dealing with high temperature wires it is necessary to apply heat, and also possibly to apply flux so as to remove the coating of insulation from the ends of the wire.

However, there are a number of inherent problems and undesirable side effects associated with all of the foregoing methods.

Heat causes embrittlement of the copper wire which is used for most armature windings and encourages rapid oxidation. The use of heat also demands a strong structure to support the commutator in order to minimize plastic distortion. This requirement usually demands the use of high temperature compression grade molding material. A further common problem is caused by the accidental stripping of insulation during winding of the armature which is often automated. As the wire passes over the metal of the commutator damage can be caused to the wire insulation and such damage will often be manifest as a short circuited winding. Additionally, there is always a danger of slack in the winding wire causing fretting under the acceleration due to centrifugal and inertial forces.

SUMMARY OF THE INVENTION

According to the present invention there is provided a planar carbon segment commutator comprising a commutator base of insulating material, the base having a rotational axis, front and rear surfaces, extending, at least in part, transversely to the rotational axis, and a plurality of first apertures extending through the base, a plurality of commutator terminals each of which comprises a terminal portion and a contact portion, the contact portion of each terminal extending through a respective first aperture in the base and being bent to lie against or in close proximity to the front surface of the base and the terminal portion of each terminal having two cutting edges for cutting insulation on a connector portion of a winding and a slot which in use straddles and grips said connector portion, and a plurality of carbon segments formed on the front surface of the base and over the contact portions, respectively, of the terminals.

Preferably, the commutator includes a housing having a plurality of housing recesses for receiving respective terminal portions.

Preferably, each housing recess has associated therewith means for positioning connector portions of the winding relative to each recess, the base, the terminals and the housing being such that with a single translational movement of the base relative to the housing, the terminal portions enter the housing recesses, the cutting edges strip insulation from connector portions of the winding and the slots establish and maintain electrical contact with connector portions of the winding by insulation displacement.

Preferably, the base has a cylindrical skirt extending rearwardly of its rear surface for receiving the housing.

Preferably, the front surface of the base has a plurality of recesses and each contact portion overlies a respective recess and has at least one aperture through which material forming a respective commutator segment extends into the recess to assist in anchoring the segment to the terminal.

Preferably, the base has a plurality of second apertures communicating with the recesses and through which material forming the commutator segments extends to assist in anchoring the segments to the base.

Preferably, the base has a plurality of third apertures through which material forming the commutator segments extends to assist in anchoring the commutator segments to the base.

BRIEF DESCRIPTION OF THE DRAWINGS

The invention will now be more particularly described, by way of example, with reference to the accompanying drawings, in which.

DESCRIPTION OF THE PREFERRED EMBODIMENT

Figure 1:
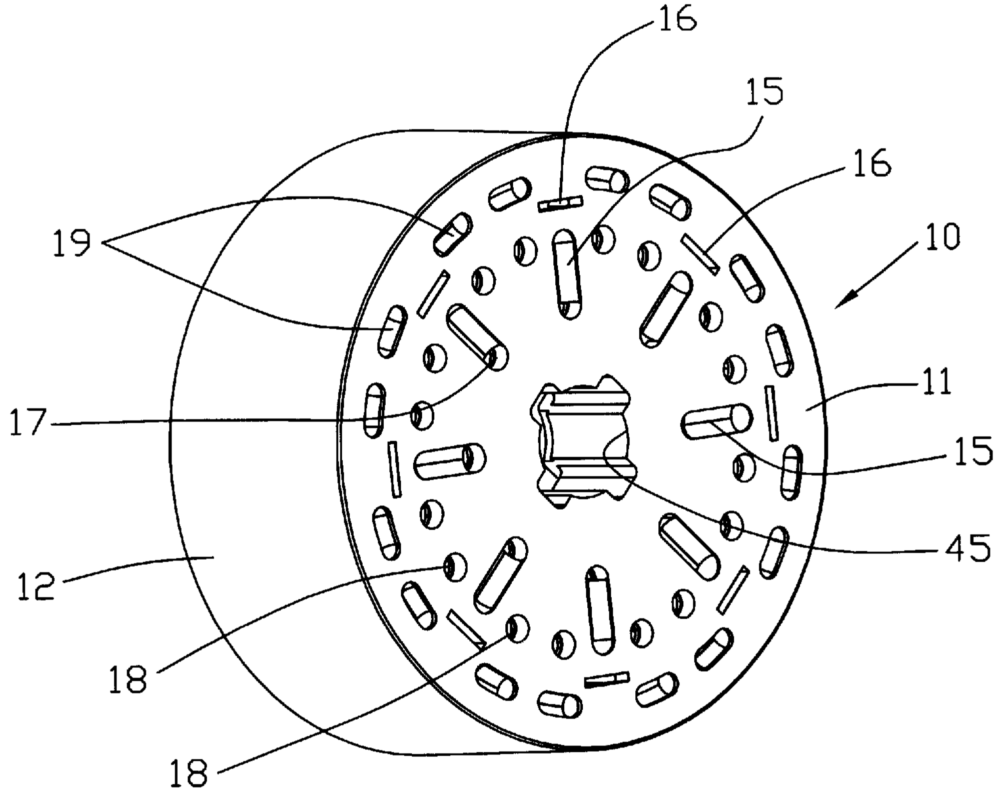
FIG. 1 is a perspective view from the front and side of a commutator base of one embodiment of a planar commutator according to a first aspect of the invention.

The commutator shown in the drawings is intended for use with small electric motors, particularly permanent magnet dc motors.

Figure 2:
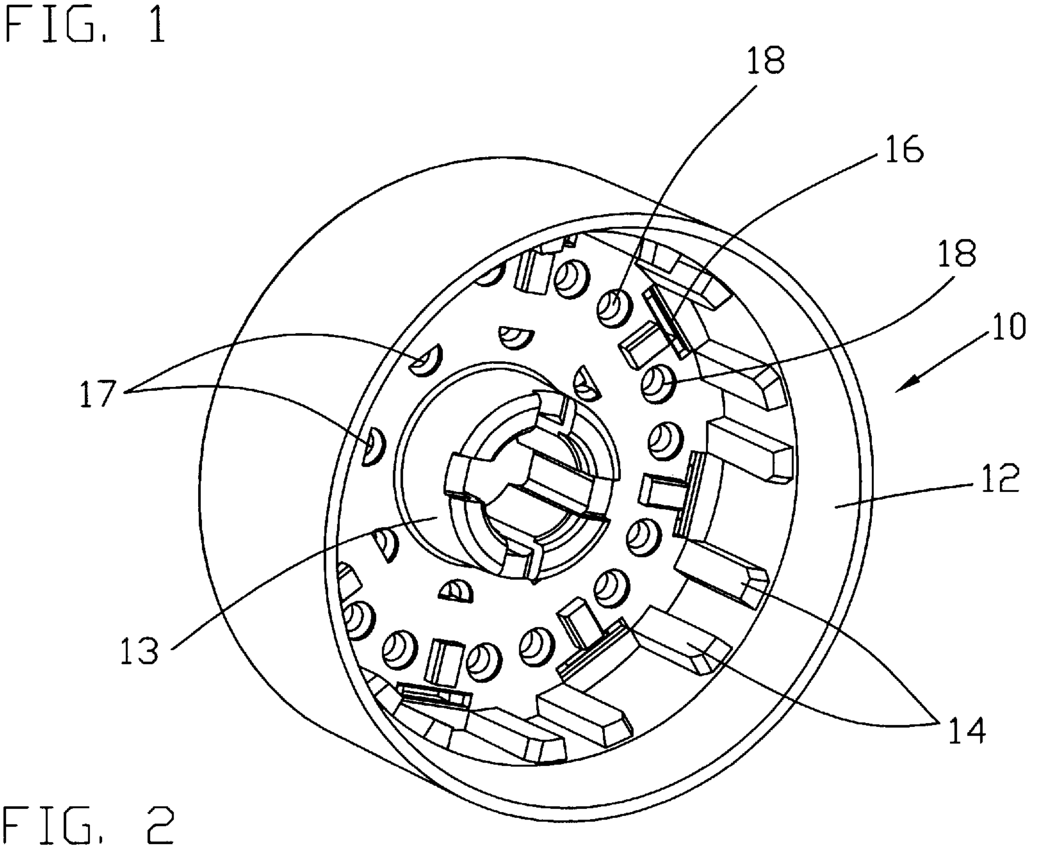
FIG. 2 is a perspective view from the rear and one side of the commutator base shown in FIG. 1.
Figure 3:
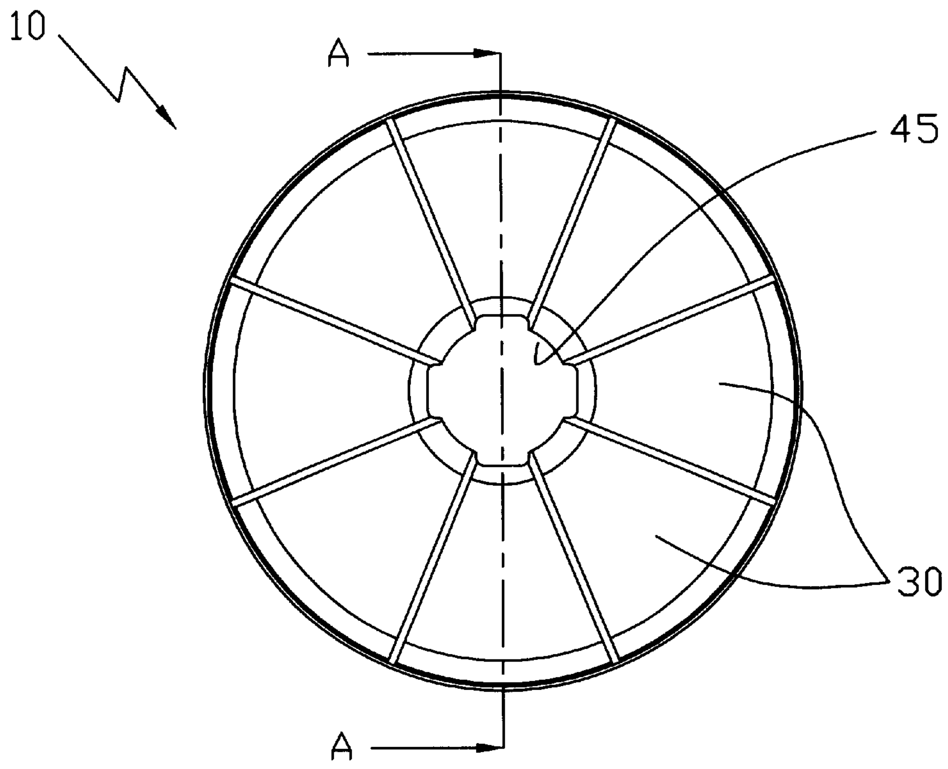
FIG. 3 is a plan view of the assembled commutator.
Figure 4:
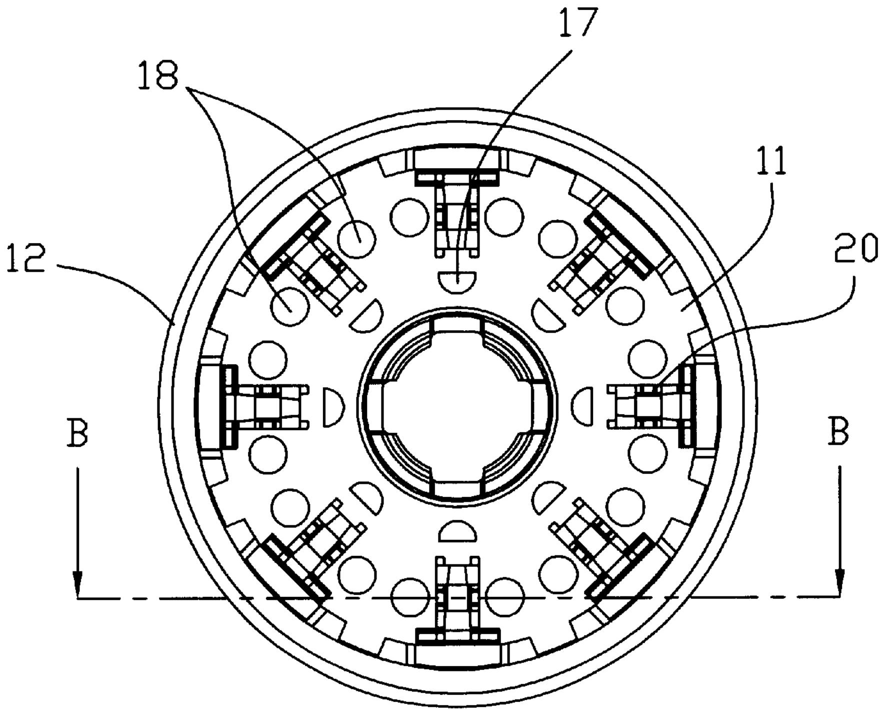
FIG. 4 is an underneath plan view of the assembled commutator.

Referring firstly to FIGS. 1 and 2, the commutator base 10 shown therein is of molded material and comprises a circular front wall 11 and a cylindrical skirt 12 extending rearwardly from the front wall 11. The base 10 also has a central boss 13 by which the base 10 can be fitted to an armature shaft (not shown).

A plurality of circumferentially spaced axially extending ribs 14 are provided on the inner surface of the skirt 12, for a purpose that will be explained later.

The front wall 11 has a central aperture 45 aligned with the boss 13, eight, equi-angularly spaced, elongate radially extending recesses 15 and an elongate, slit-like, aperture 16 radially aligned with each recess 15.

Each recess 15 communicates at its radially inner end with an aperture 17.

Each recess 15 is also associated with two apertures 18, one on either side of a respective recess 15 and adjacent its radially outer end.

The front wall 11 also has an outer ring of angularly spaced apart slots 19.

Figure 7:
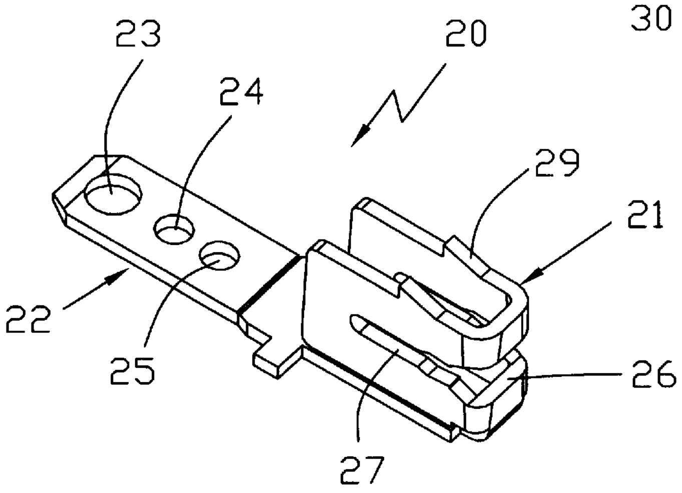
FIG. 7 is a perspective view of a commutator terminal on an enlarged scale.
Figure 8:
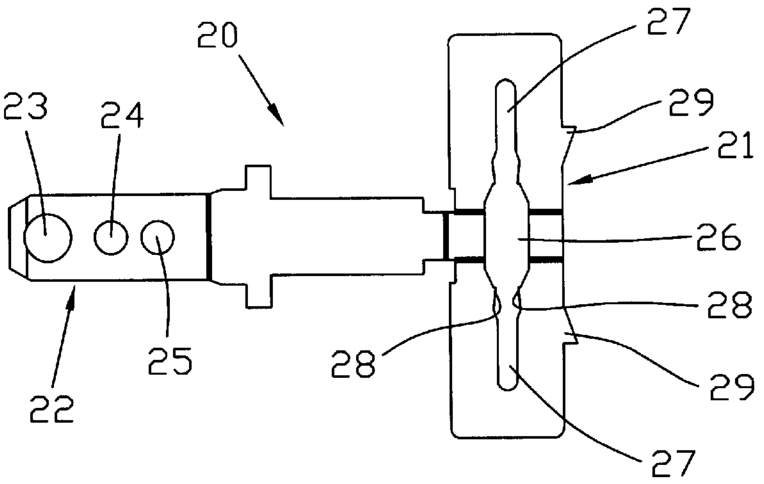
FIG. 8 is a developed view of the terminal shown in FIG. 7.

The commutator terminal 20 shown in FIGS. 7 and 8 comprises a terminal portion 21 and a contact portion 22. The contact portion 22 is in the form of a finger having three apertures 23, 24 and 25 therein. The terminal portion 21 is rectangular (as shown in developed view) with its minor axis coincident with the longitudinal axis of the contact portion 22. The terminal portion 21 has a central cut out portion 26 which is symmetrical with respect to both the major and minor axes of the terminal portion 21. The cut out portion 26 reduces from its largest width at the center of the terminal portion 21 to two slots 27. Two cutters 28 project a short distance into each slot 27. These cutters 28 form sharp edges for cutting insulation on a connector portion of an armature winding. The terminal portion 21 also has two barbs 29 for a purpose which will become apparent later.

To assemble the terminals 20 to the base 10, the fingers 22 are pressed through respective apertures 16 in the base 10 and the fingers 22 are then bent over respective recesses 15 to extend radially inwards.

Figure 5:
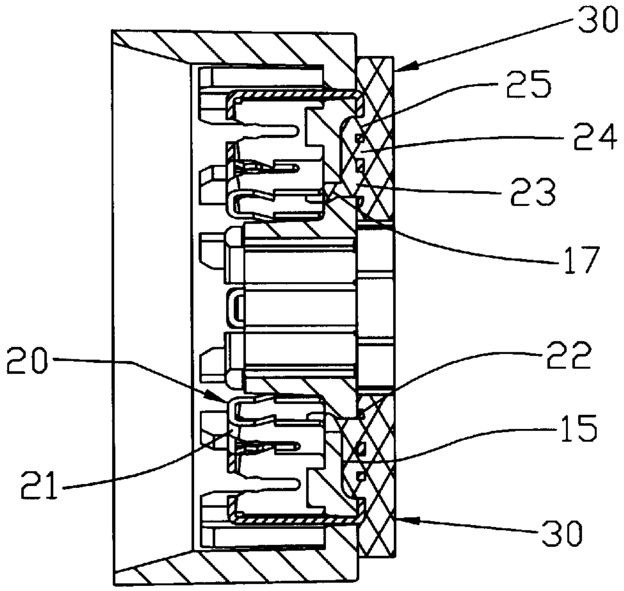
FIG. 5 is a section taken along the line A—A of FIG. 3.
Figure 6:
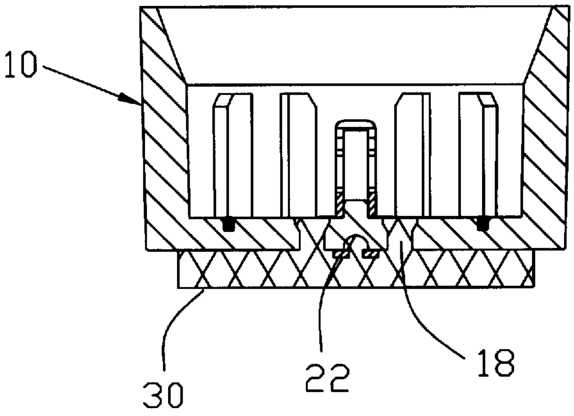
FIG. 6 is a section taken along the line B—B of FIG. 4.

Carbon commutator segments 30 are then formed on the front wall 11 of the commutator base 10 over the fingers 22. This may be achieved by hot pressing a disc of green graphite material onto the front wall 11 and then cutting the disc into eight individual segments 30. Green graphite material is a graphite mixture prior to sintering or heat treating during which the binder material is set. During the hot pressing, the binder is softened (possibly liquified) and this allows the mixture to flow under pressure through the apertures 23, 24 and 25 in the fingers 22 and into the recesses 15, into the slots 19 and through the apertures 17 and 18, as best shown in FIGS. 5 and 6, to anchor the disc to the base 10. The binder, being of thermoset material such as phenolic resin, once melted and cooled becomes heat resistant, creating a stable contact surface for the commutator. As an alternative to the hot pressing process an overmoulding process can be used. In this latter process, the components, namely the commutator base 10 and the terminals 20 are placed into a mould and graphite material is injected into the mould after the latter has been closed. The hot pressing or molding process creates a good electrical connection with the fingers 22.

Figure 9:
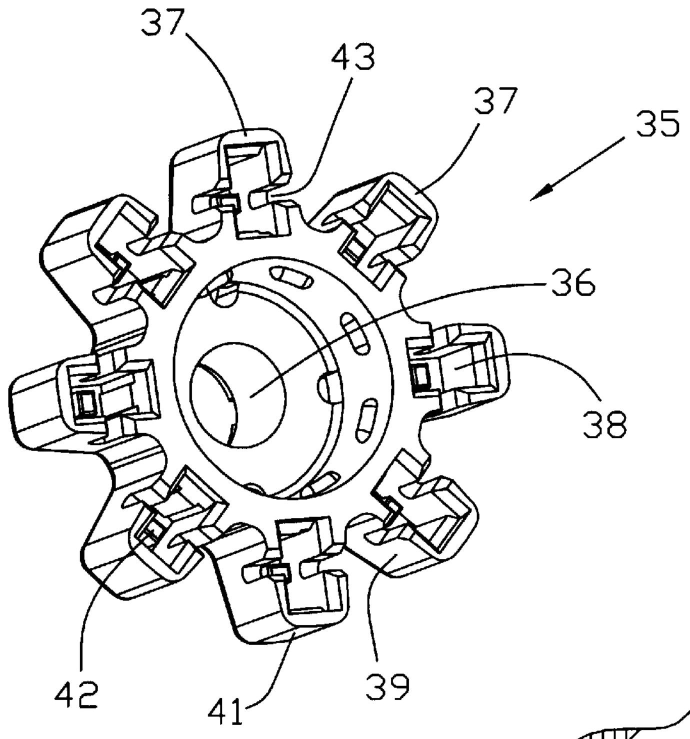
FIG. 9 is a perspective view of a housing for the terminals.
Figure 10:
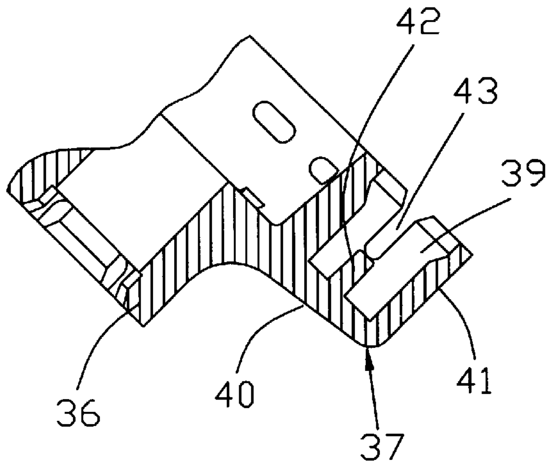
FIG. 10 is a fragmentary sectional view of part of the housing of FIG. 9.

Referring now to FIGS. 9 and 10, there is shown therein a housing 35 for the terminal portions 21 of the terminals 20. This housing 35 is of crown-like shape and has a central boss 36 for receiving the armature shaft and eight radially outwardly extending housing portions 37 equally spaced around the circumference of the boss 36. Each of the housing portions 37 defines a housing recess 38 and is used to effect connection between a respective portion of the armature winding and one of the terminal portions 21 of the terminals 20. Each housing portion 37 has side walls 39, an end wall 40, and a cover 41. The side walls 39 are parallel to the longitudinal axis of the boss 36.

A stump 42 projects centrally from the internal surface of the end wall 40 and extends within the housing portion 37 for approximately half the length of the side walls 39. The stump 42 extends parallel with the longitudinal axis of the boss 36 and is only connected to the housing 35 by the end wall 40. Each side wall 39 has a slot 43 which extends parallel to the longitudinal axis of the boss 36, from the commutator end of the housing 35 for a length which terminates at the level of the free end of the stump 42. A portion of an armature winding can be passed through the slots 43 so that the winding portion rests on the end of the stump.

During assembly of the armature of an electric motor, the housing 35 is placed on the armature shaft. The lead wire of the armature winding is inserted into one of the housing portions 37 by laying the end of the wire in the slots 43 provided in the side walls 39. The wire is drawn back into the housing portion 37 until it rests against the stump 42. From this start, the first armature coil is wound. At the end of the first coil winding, the armature is indexed and the wire is laid in the same manner in the next housing portion 37 without breaking the continuity of the wire. This process is repeated until all coils have been wound and the tail end of the winding is then laid in the slots 43 of the first housing portion 37 and pushed back until it is adjacent to the lead end which was placed against the stump 42 at the beginning of the winding operation. The wire is then cut and the armature removed from the winding machine.

The housing 35 now has a winding portion comprising insulated wire laying in each of the housing portions 37. Each of the winding portions is under tension and is pulled tight against the respective stump 42. The commutator base 10, together with the terminals 20 and commutator segments 30, is then slid along the armature shaft so that the terminal portions 21 of the terminals enter respective housing portions 37 and the housing portions lie between the ribs 14. As each terminal portion 21 approaches a winding portion held in a housing portion 37, the slots 27 move over the wire. The cutters 28 sever the insulation on the wire which is deformed as the slots move over the wire. Intimate metal to metal contact is thereby provided between the wire and the terminal portions 20. The barbs 29 grip the cover 41 of the housing 35 and therefore retain the terminal portions 21 within the housing 35.

This manner of manufacture of a commutator lends itself to an automated process. No application of heat is required and the associated risk of distorting the housing 35 is therefore avoided. No embrittlement of the winding wire is caused and problems associated with oxidation are also avoided. The use of flux is negated and there is no chemical reaction or consequent erosion resulting from the connection. The armature winding can be a single continuous winding and the danger of introducing slack by breaking the winding to effect a connection to each coil can be avoided.

The above embodiment is given by way of example only and various modifications will be apparent to persons skilled in the art without departing from the scope of the invention as defined in the appended claims.

What is claimed is:

1. A planar carbon segment commutator, comprising:

a commutator base of insulating material, the base having a rotational axis, front and rear surfaces extending, at least in part, transversely to the rotational axis, and a plurality of first apertures extending through the base;

a plurality of commutator terminals, each of the commutator terminals comprising:

a terminal portion having a cutting edge for cutting insulation on a connector portion of a winding and a slot which, in use, straddles and grips said connector portion, and a contact portion extending through one of said first apertures in the base and being bent at an angle which is substantially perpendicular to the terminal portion so as to lie against or in close proximity to the front surface of the base; and a plurality of carbon commutator segments formed on the front surface of the base and over the contact portions, respectively, of the terminals.

2. The commutator of claim 1, further comprising a housing having a plurality of housing recesses for receiving the terminal portions, respectively, of the terminals.

3. The commutator of claim 2, wherein each housing recess has associated therewith means for positioning the connector portions of the winding relative to each recess; the base, the terminals and the housing being such that with a single translational movement of the base relative to the housing, the terminal portions enter the housing recesses, the cutting edges strip insulation from the connector portions of the winding and the slots establish and maintain electrical contact with the connector portions of the winding by insulation displacement.

4. The commutator of claim 2, wherein the base has a cylindrical skirt extending rearwardly of its rear surface for receiving the housing.

5. The commutator of claim 2, wherein the base has a central boss for receiving an armature shaft.

6. The commutator of claim 5, wherein the housing has a central boss coaxial with the boss of the base for receiving the armature shaft.

7. The commutator of claim 1, wherein the front surface of the base has therein a plurality of recesses and each contact portion overlies a respective recess and has at least one aperture through which material forming a respective commutator segment extends into the recess to assist in anchoring the segment to the terminal.

8. The commutator of claim 7, wherein the base has a plurality of second apertures communicating with respective recesses and through which material forming the commutator segments extends to assist in anchoring the segments to the base.

9. The commutator of claim 7, wherein the recesses are elongate and extend radially of the base.

10. The commutator of claim 7, wherein the first apertures are radially aligned with and outwardly disposed of the recesses, respectively.

11. The commutator of claim 7, wherein the base has a plurality of third apertures spaced from the recesses and through which material forming the commutator segments extends to assist in anchoring the commutator segments to the base.

12. The commutator of claim 11, wherein two third apertures are associated with each recess, one on either side of a respective recess.

13. The commutator of claim 1, wherein the base has a plurality of third apertures through which material forming the commutator segments extends to assist in anchoring the commutator segments to the base.

14. The commutator of claim 1, wherein the base has a central boss for receiving an armature shaft.

15. A planar carbon segment commutator, comprising:

a commutator base of insulating material, the base having a rotational axis, front and rear surfaces extending, at least in part, transversely to the rotational axis, and a plurality of first apertures extending through the base;

a plurality of commutator terminals, each commutator terminal comprising a terminal portion and a contact portion, each contact portion extending through one of said first apertures in the base and being bent to lie against or in close proximity to the front surface of the base, each terminal portion having a cutting edge for cutting insulation on a connector portion of a winding and a slot which, in use, straddles and grips said connector portion; and a plurality of carbon commutator segments formed on the front surface of the base and over the contact portions, respectively, of the terminals, wherein the base has a plurality of third apertures through which material forming the carbon commutator segments extends to assist in anchoring the carbon commutator segments to the base.

16. The planar carbon segment commutator of claim 15, wherein further comprising a housing having a plurality of housing recesses for receiving the terminal portions, respectively, of the terminals.

17. The planar carbon segment commutator of claim 15, wherein each housing recess has associated therewith means for positioning the connector portions of the winding relative to each recess; the base, the terminals and the housing being such that with a single translational movement of the base relative to the housing, the terminal portions enter the housing recesses, the cutting edges strip insulation from the connector portions of the winding and the slots establish and maintain electrical contact with the connector portions of the winding by insulation displacement.

18. A planar carbon segment commutator comprising:

a commutator base of insulating material, the base having a rotational axis, front and rear surfaces extending, at least in part, transversely to the rotational axis, and a plurality of first apertures extending through the base;

a plurality of commutator terminals, each of the commutator terminals comprising:

- a terminal portion having a first slot and a second slot, the planes of which face each other, each of the slots straddling and gripping a connector portion of a winding and having a cutting edge for cutting insulation on said connector portion; and
- a contact portion extending through one of said first apertures in the base and being bent to lie against or in close proximity to the front surface of the base; and a plurality of carbon commutator segments formed on the front surface of the base and over the contact portions, respectively, of the terminals.

19. The planar carbon segment commutator of claim 18, wherein further comprising a housing having a plurality of housing recesses for receiving the terminal portions, respectively, of the terminals.

20. The planar carbon segment commutator of claim 18, wherein each housing recess has associated therewith means for positioning the connector portions of the winding relative to each recess; the base, the terminals and the housing being such that with a single translational movement of the base relative to the housing, the terminal portions enter the housing recesses, the cutting edges strip insulation from the connector portions of the winding and the slots establish and maintain electrical contact with the connector portions of the winding by insulation displacement.

* * * * *